April 30, 1957 C. H. HARTER 2,790,581
DISPENSING CAP FOR MOUNTING ON A BOTTLE OR OTHER CONTAINER
Filed March 31, 1955
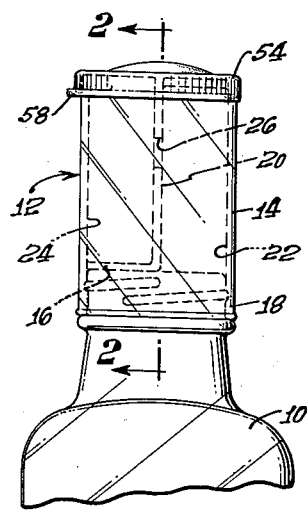
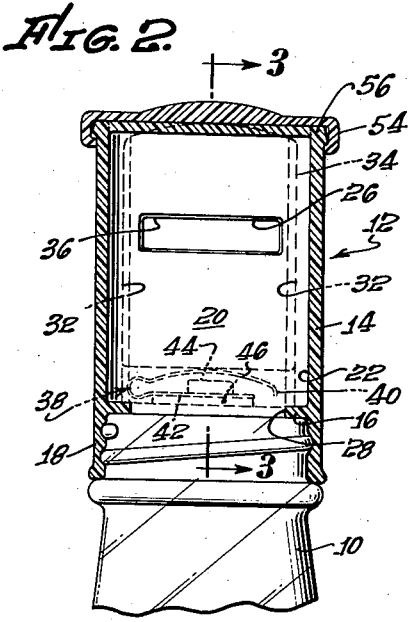
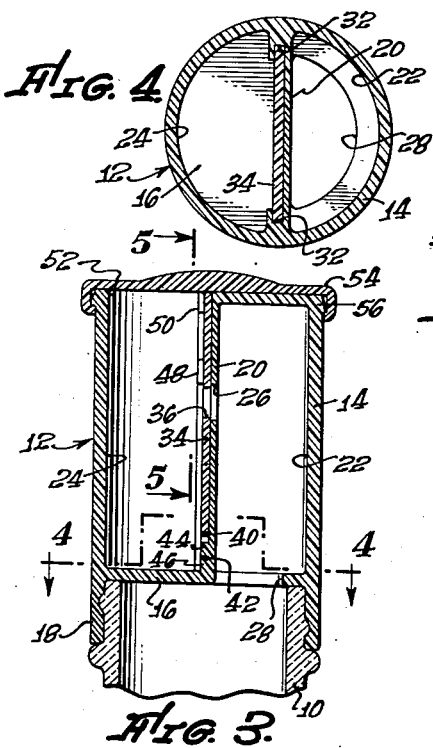
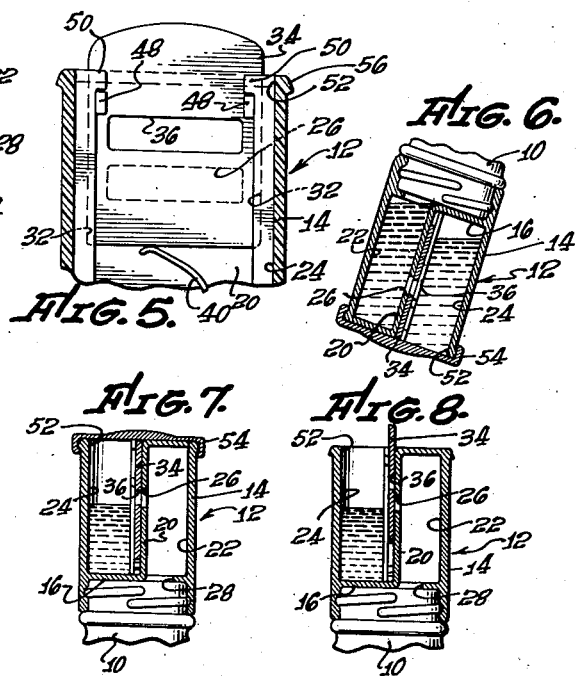
INVENTOR.
CHARLES H. HARTER,
BY HIS ATTORNEYS
HARRIS, KIECH, FOSTER & HARRIS.

2,790,581
Patented Apr. 30, 1957

2,790,581

DISPENSING CAP FOR MOUNTING ON A BOTTLE OR OTHER CONTAINER

Charles H. Harter, Red Bluff, Calif., assignor to Ideavelopers, Inc., Red Bluff, Calif., a corporation of California Application March 31, 1955, Serial No. 498,239

7 Claims. (Cl. 222—455)

The present invention relates in general to dispensers and, more particularly, to a device for dispensing a measured quantity of material from a container and having the form of a cap threaded or otherwise mounted on the container in communication with the interior thereof.

In general, an object of the invention is to provide a dispenser which is positive and accurate in its action, but which is relatively simple and inexpensive to manufacture.

Another object is to provide a dispensing cap which includes a compartment having a discharge opening adjacent the top thereof and having an inlet opening or port above the bottom thereof. With this construction, an accurately predetermined amount of material may be trapped in the compartment below the inlet opening for subsequent discharge through the discharge opening, which is an important feature.

Another object is to provide a valve, controlled by a closure for the discharge opening of the compartment, for opening and closing the inlet opening into the compartment so as to open and close communication between the compartment and the interior of the container. More particularly, an object is to provide a dispensing cap wherein the valve is opened by the cover when it closes the discharge opening in the compartment, and which is movable to a closed position upon removal of the cover. A related object is to provide spring means for biasing the valve toward its closed position.

With the foregoing construction, by inverting the container with the cover in place so that the valve is in its open position, the contents of the container flow into the compartment through the inlet opening. When the container is subsequently righted, any excess material in the compartment flows back into the container through the inlet opening, whereby an accurately measured quantity of material is trapped in the compartment. Upon removal of the cover for the discharge opening of the compartment, the valve is moved into its closed position by the spring means to prevent further communication between the container and the compartment, whereupon the accurately measured amount of material trapped in the compartment may be poured therefrom through the discharge opening. Thus, the invention provides a simple and positive mode of operation, which is an important feature.

An important object of the invention is to provide a dispensing cap of the foregoing nature wherein the valve is a simple slide valve engaging one wall of the compartment and having therein a port which registers with the inlet opening in the compartment when the valve is opened by the cover, and which is out of registry with the inlet opening in the compartment when the valve is closed by the spring means upon removal of the cover.

Another object is to provide a dispensing cap wherein the slide valve is a simple, flat gate valve slidable on a flat wall of the compartment, such compartment wall having the inlet opening into the compartment formed therein. With this construction, a very simple construction is provided which may readily be made leakproof, particularly through the use of such materials as nylon, "Teflon," polyethylene, and the like.

Another object of the invention is to provide a dispensing cap wherein the upper end of the slide valve is engaged by the cover to register the port in the slide valve with the inlet opening into the compartment when the cover is in place, thereby providing a very simple and inexpensive construction.

Another object is to provide a dispensing cap wherein the spring means for biasing the slide valve toward its closed position is a simple leaf spring engaging the lower end of the slide valve.

The foregoing objects, advantages and features of the present invention, together with various other objects, advantages and features thereof which will become apparent, may be attained with the exemplary embodiment of the invention which is illustrated in the accompanying drawing and which is described in detail hereinafter. Referring to the drawing:

Fig. 1 is a side elevation of the dispensing cap of the invention with the cover thereof in place to open the valve;

Fig. 2 is an enlarged sectional view taken along the arrowed line 2—2 of Fig. 1;

Fig. 3 is a sectional view taken along the arrowed line 3—3 of Fig. 2;

Fig. 4 is a transverse sectional view taken along the arrowed line 4—4 of Fig. 3;

Fig. 5 is a fragmentary sectional view taken along the arrowed line 5—5 of Fig. 3 with the cover removed to permit the valve to close; and Figs. 6, 7 and 8 are views on a reduced scale illustrating the operation of the dispensing cap of the invention.

In the drawing, the numeral 10 designates a conventional container, shown as a bottle, on which is mounted the dispensing device of the invention, designated generally by the numeral 12. In the particular construction illustrated, the dispensing device 12 has the form of a cap adapted to be threaded on the bottle 10. However, it will be understood that the dispensing device 12 may be mounted on the container 10 in other ways.

Considering the particular construction illustrated, the dispensing cap 12 includes a cylindrical wall 14 having a transverse partition 16 adjacent its lower end, this partition being adapted to seat on the upper end of the bottle 10 with a gasket, not shown, disposed between the transverse partition 16 and the upper end of the bottle if desired. The cylindrical wall 14 provides, below the transverse partition 16, a depending skirt 18 adapted to be threaded onto the bottle 10.

The space surrounded by the cylindrical wall 14 above the transverse partition 16 is divided, by a longitudinal partition 20, into a hemicylindrical compartment 22 and a hemicylindrical compartment 24. The longitudinal partition 20 is provided with an inlet opening or port 26 therein above the bottom of the compartment 24, the cross sectional dimensions of the compartment 24 and the distance of the inlet port 26 above the bottom thereof determining the amount of material metered, as will become apparent. The transverse partition 16 is provided with an opening 28 therein at the bottom of the compartment 22 which connects this compartment in communication with the interior of the bottle 10. Thus, the compartment 22, the inlet port 26, and the opening 28 provide a passage or passage means for connecting the compartment 24 in communication with the interior of the bottle.

The longitudinal partition 20 is provided on one side thereof with channels 32 adjacent its edges which receive the respective edges of a slide valve 34, this slide valve having a port 36 which registers with the inlet port 26 when the slide valve is in its open position, and which is out of registry with the inlet port 26 when the slide valve is in its closed position. For simplicity, the slide valve 34 is a flat, gate valve and the partition 20 is a flat wall of the compartment 24. The slide valve 34 fits fairly snugly in the channels 32 to hold the slide valve against the partition 20 in a fluid-tight manner. The seal between the slide valve 34 and the partition 20 may be enhanced through the use of materials of the nature hereinbefore outlined.

The slide valve 34 is biased upwardly toward its closed position by a spring means shown as comprising a leaf spring 38 having an arm 40 which bears against the lower end of the slide valve and having an arm 42 inserted between lugs 44 and 46 on the wall 20 to hold the spring in place. Movement of the slide valve 34 upwardly beyond its open position under the influence of the spring 38 is prevented by engagement of stops 48 on the slide valve with stops 50 at the upper ends of the channels 32.

The compartment 24 is provided at its upper end with a discharge opening 52 which may be closed by a cover 54. In the particular construction illustrated, the cover is formed of a relatively flexible plastic material, such as polyethylene, and is adapted to snap over a bead 56 at the upper end of the cylindrical wall 14, being provided with a tab 58 for easy removal. When the cover 54 is in place, it engages the upper end of the slide valve 34 to hold it in its open position.

Considering the operation of the dispensing cap 12, it is mounted on the bottle 10 with the cover 54 in place so that the slide valve 34 is in a position to register the port 36 therein with the inlet port 26 in the partition 20. By inverting the bottle 10, as shown in Fig. 6 of the drawing, the material in the bottle will flow through the opening 28, the compartment 22 and the ports 26 and 36 into the compartment 24 to substantially fill this compartment, except for an air space. However, the compartment 24 is sufficiently large so that, even with this air space, more than the metered quantity of material enters this compartment.

Then, as shown in Fig. 7 of the drawing, the bottle 10 is righted, whereupon the excess material in the compartment 24 flows back into the bottle 10 through the ports 26 and 36, the compartment 22 and the opening 28. Thus, an accurately metered amount of material is trapped in the compartment 24, the cross sectional dimensions of this compartment and the distance of the inlet port 26 above the bottom thereof being such as to provide the desired volume. This volume may, for example, be one-quarter teaspoon, one-half teaspoon, one teaspoon, one tablespoon, or the like.

Referring to Fig. 8 of the drawing, the cover 54 is then removed, whereupon the spring 38 moves the slide valve 34 into its closed position to cut off communication between the trapping compartment 24 and the interior of the bottle 10. The metered quantity of material may now be poured through the discharge opening 52 into any suitable container by inverting the bottle 10, or if the bottle contains a medicinal preparation to be taken internally, the quantity thereof trapped in the compartment 24 may be poured directly into the mouth of the user, thereby avoiding any necessity for an intermediate receptacle.

Thus, it will be seen that the present invention provides a dispensing device which is accurate and positive in its action, but which is of simple construction and thus inexpensive to manufacture, which are important features.

Although an exemplary embodiment of the invention has been disclosed herein for purposes of illustration, it will be understood that various changes, modifications and substitutions may be incorporated in such embodiment without departing from the spirit of the invention as defined by the patent claims hereinafter appearing.

I claim as my invention:

1. In a dispenser for mounting on a container from which a material is to be dispensed, said dispenser being considered herein in its upright position, the combination of: a compartment having a discharge opening and having an inlet opening in one wall thereof above the bottom thereof; passage means providing communication between said inlet opening and the container when said dispenser is mounted thereon; a cover for closing said discharge opening; and a movable valve engageable by and controlled by said cover and engageable with said wall around said inlet opening to open and close said inlet opening.

2. In a dispenser for mounting on a container from which a material is to be dispensed, said dispenser being considered herein in its upright position, the combination of: a compartment having a discharge opening; passage means communicating at one end with said compartment above the bottom thereof and communicating at its other end with the container when said dispenser is mounted thereon; a movable slide valve for opening and closing said one end of said passage means; cover means for said discharge opening engageable with said slide valve for maintaining said slide valve in its open position to provide communication between said compartment and the container; and means for biasing said slide valve toward its closed position in opposition to the opening action of said cover means.

3. A dispenser as defined in claim 2 wherein said slide valve is a gate valve slidable on a wall of said compartment in which said one end of said passage means is formed.

4. In a dispenser for mounting on a container from which a material is to be dispensed, said dispenser being considered herein in its upright position, the combination of: two compartments separated by a common partition having a port therethrough above the bottoms of said compartments, one of said compartments being open at the bottom to communicate with the container when said dispenser is mounted thereon, and the other of said compartments being open at the top; a cover for said other compartment; and a valve for opening and closing said port between said compartments, said valve being engageable by said cover to open said port.

5. In a dispenser for mounting on a container from which a material is to be dispensed, said dispenser being considered herein in its upright position, the combination of: two compartments separated by a common partition having a port therethrough above the bottoms of said compartments, one of said compartments being open at the bottom to communicate with the container when said dispenser is mounted thereon, and the other of said compartments being open at the top; a cover for said other compartment; and a valve for opening and closing said port between said compartments, said valve being engageable by said cover to open said port, said valve being a slide valve engaging said partition and having therein a port which registers with said port in said partition when said cover engages said valve and closes the top of said other compartment.

6. In a dispenser for mounting on a container from which a material is to be dispensed, said dispenser being considered herein in its upright position, the combination of: two compartments separated by a common partition having a port therethrough above the bottoms of said compartments, one of said compartments being open at the bottom to communicate with the container when said dispenser is mounted thereon, and the other of said compartments being open at the top; a cover for said other compartment; a valve for opening and closing said port between said compartments, said valve being engageable by said cover to open said port, said valve being a slide valve engaging said partition and having therein a port which registers with said port in said partition when said cover engages said valve and closes the top of said other compartment; and spring means engaging said valve and biasing said ports out of registry.

7. A dispenser as defined in claim 4 wherein said compartments are hemicylindrical, and wherein said partition substantially coincides with a diametral plane of the cylinder formed by said hemicylindrical compartments.

References Cited in the file of this patent

UNITED STATES PATENTS

| | | |
|---|---|---|
| 2,038,418 | Conner | Apr. 21, 1936 |
| 2,243,452 | Bickel et al. | May 27, 1941 |
| 2,446,085 | Gronemeyer et al. | July 27, 1948 |
| 2,676,734 | Mertens | Apr. 27, 1954 |